US012560213B2

(12) United States Patent
Li

(10) Patent No.: US 12,560,213 B2
(45) Date of Patent: Feb. 24, 2026

(54) BRAKE COOLING CONTROL SYSTEM

(71) Applicant: Honeywell International Inc., Charlotte, NC (US)

(72) Inventor: Yanling Li, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 32 days.

(21) Appl. No.: 18/531,028

(22) Filed: Dec. 6, 2023

(65) Prior Publication Data

US 2025/0189005 A1     Jun. 12, 2025

(51) Int. Cl.
| | |
|---|---|
| *F16D 65/847* | (2006.01) |
| *B60T 5/00* | (2006.01) |
| *B60T 17/22* | (2006.01) |
| *B64C 25/44* | (2006.01) |
| *F16D 65/78* | (2006.01) |
| *F16D 66/00* | (2006.01) |

(52) U.S. Cl.
CPC .............. *F16D 65/847* (2013.01); *B60T 5/00* (2013.01); *B60T 17/22* (2013.01); *B64C 25/44* (2013.01); *F16D 66/00* (2013.01); *B60T 2240/00* (2013.01); *B60T 2250/04* (2013.01); *F16D 2065/783* (2013.01); *F16D 2065/787* (2013.01); *F16D 2066/001* (2013.01)

(58) Field of Classification Search
CPC .. F16D 65/847; F16D 66/00; F16D 2065/783; F16D 2065/787; F16D 2066/001; B60T 5/00; B60T 17/22; B60T 2240/00; B60T 2250/04; B64C 25/44
See application file for complete search history.

(56) References Cited

U.S. PATENT DOCUMENTS

| | | | |
|---|---|---|---|
| 9,573,567 B2 | 2/2017 | Kirkbride et al. | |
| 9,738,264 B2 * | 8/2017 | Georgin | ............... F16D 65/128 |
| 11,136,145 B2 | 10/2021 | Bill | |
| 11,878,788 B2 * | 1/2024 | Franzini | ............... B64C 25/426 |
| 2016/0356331 A1 * | 12/2016 | Bill | ........................... H02P 1/54 |

(Continued)

FOREIGN PATENT DOCUMENTS

| | | |
|---|---|---|
| CN | 112360908 A | 2/2021 |
| CN | 112937516 A | 6/2021 |

(Continued)

OTHER PUBLICATIONS

"LTG Solutions for Aviation—Brake Cooling System Type BCS 315", Air Tech Systems, LTG-INC.net, Feb. 2016, 2 pp.

(Continued)

*Primary Examiner* — Thomas Ingram
(74) *Attorney, Agent, or Firm* — Shumaker & Sieffert, P.A.

(57) ABSTRACT

In some examples, a cooling system defines a first flow path for a first gas stream and a second flow path for a second gas stream. The cooling system is configured to merge the first gas stream and the second gas stream to produce a mixed gas stream and provide the mixed gas stream to cool a brake assembly of a wheel. Control circuitry is configured to adjust a flow rate of the second gas stream based on a pressure and/or other flow parameter of the first gas stream. In examples, the control circuitry is configured to initiate and/or substantially cease cooling to the brake assembly based on a temperature signal indicative of a temperature of the brake assembly.

20 Claims, 6 Drawing Sheets

(56)         References Cited

U.S. PATENT DOCUMENTS

| | | | | |
|---|---|---|---|---|
| 2017/0305577 A1* | 10/2017 | Bill | .......................... | B60T 17/22 |
| 2017/0313295 A1* | 11/2017 | Georgin | ................. | G01K 13/08 |
| 2019/0219118 A1* | 7/2019 | Jeffery | .................... | F16D 65/84 |
| 2019/0283728 A1* | 9/2019 | Jimenez | ................. | G01R 31/52 |
| 2019/0329910 A1 | 10/2019 | Bill | | |
| 2020/0079332 A1* | 3/2020 | Gadd | .................... | B60T 17/221 |
| 2021/0107441 A1* | 4/2021 | Georgin | ................ | B60T 17/221 |
| 2022/0134815 A1* | 5/2022 | Bill | ....................... | G06F 3/0652 |
| | | | | 701/31.7 |
| 2022/0205503 A1* | 6/2022 | Oza | .......................... | B60T 17/22 |
| 2024/0426359 A1* | 12/2024 | Mandal | ................... | F16D 65/78 |
| 2025/0162564 A1* | 5/2025 | Laraki | ..................... | B60T 17/22 |

FOREIGN PATENT DOCUMENTS

| | | |
|---|---|---|
| CN | 110562443 B | 10/2022 |
| EP | 3862737 A1 | 8/2021 |
| EP | 3936396 A1 | 1/2022 |

OTHER PUBLICATIONS

Mirza, "Economic Impact of Airplane Turn-Times", Boeing Aero Managzine, Dec. 2008, pp. 15-19.
Extended Search Report from counterpart European Application No. 24212436.0 dated May 9, 2025, 7 pp.
Response to Extended Search Report dated May 9, 2025, from counterpart European Application No. 24212436.0 filed Aug. 28, 2025, 38 pp.

\* cited by examiner

100

VEHICLE
102

WHEEL(S)
104

BRAKE ASSEMBLY
106

SENSOR(S)
108

TEMPERATURE
SENSOR(S)
110

BRAKE COOLING
DEVICE
114

BRAKE CONTROL UNIT
(BCU)
112

PROCESSING
CIRCUITRY
113

COMMUNICATIONS
CIRCUITRY
116

MEMORY
118

UI
120

BRAKE COOLING CONTROL SYSTEM

TECHNICAL FIELD

The present disclosure relates to brake systems for a vehicle.

BACKGROUND

Vehicles, such as aircraft, may use a wheel brake assembly that includes a multi-disc brake assembly. For example, the multi-disc brake assembly may include a disc stack comprising plurality of rotor discs engaged with a wheel and a plurality of stator discs interleaved with the rotor discs. The rotor discs and wheel are configured to rotate around an axle, while the stator discs remain stationary. To decelerate rotational motion of a rotating wheel, the brake assembly may displace pistons against a pressure plate to compress the rotating rotor discs engaged with the wheel against the stationary stator discs, therefore producing torque that decelerates the rotational motion of the wheel. In some examples, the rotor discs may be engaged with the wheel via rotor drive keys positioned on an interior surface of the wheel. In some examples, stator discs may be engaged with a stationary torque tube surrounding the axle via splines positioned on the torque tube. In some such examples, the brake assembly may be configured to compress the rotor discs and the stator discs between the piston and a backing plate supported by the torque tube.

SUMMARY

The present disclosure describes devices, systems, and techniques relating to cooling one or more components of a wheel brake assembly of a vehicle. One or more components of the brake assembly may generate thermal energy via friction as the brake assembly is applied to stop and/or slow the vehicle. The one or more components may need to be cooled prior to reapplication of the brake assembly to prevent malfunction and/or damage to the brake assembly. In some examples, there may be sufficient time between applications of the brake assembly to allow for natural cooling of the one or more components of the brake assembly. For example, the vehicle may be stationary for a sufficient amount of time to allow for natural cooling of the one or more components to within a threshold temperature range. In some examples, there may be insufficient time to allow the one or more components to cool naturally. In such examples, an operator of the vehicle may need to activate a brake cooling system of the vehicle to actively cool the one or more components (e.g., via one or more gas streams, via one or more fans). Requiring the operator to manually activate and/or deactivate the active brake cooling system may distract the operator from operation of the vehicle.

This disclosure describes example devices, methods, and systems for automatically activating and/or deactivating a brake cooling system based on satisfaction of one or more threshold conditions. Threshold conditions may correspond to, but are not limited to, a speed of vehicle, a status of the vehicle (e.g., whether the vehicle is on the ground, whether the vehicle is in the air), a temperature of a brake of the brake cooling system, and/or a status of the brake cooling system. In some examples, a cooling system described herein may activate the brake cooling system to cool one or more components of the brake assembly (e.g., the brake) based on satisfaction of the one or more threshold conditions. For example, the cooling system may active the brake cooling system based on a determination that the status of the brake cooling system satisfies a threshold condition and that the vehicle satisfies one or more other threshold conditions. The cooling system may deactivate the brake cooling system based on a determination that the one or more threshold conditions are no longer satisfied.

The devices, systems, and methods described herein may provide several technological benefits over other vehicle brake assembly cooling systems. By activating and deactivating the brake cooling system based on satisfactions or non-satisfactions of threshold conditions, respectively, the example devices, systems, and methods described herein may reduce unnecessary cooling of the one or more components of the brake assembly, thereby reducing unnecessary power consumption. In some examples, the devices, systems, and methods described herein may automatically activate or deactivate the brake cooling system based on the one or more threshold conditions, which may reduce an amount of information outputted to the operator and/or operations the operator needs to perform, thereby reducing a potential for operator distraction during operation of the vehicle. The example devices, systems, and methods may be implemented on existing vehicles with minor or no modifications to the existing vehicles, brake assemblies, and brake cooling systems, which may allow for existing vehicles to cool brake assemblies at increased efficiencies in accordance with this disclosure without requiring significant and costly modifications.

In some examples, this disclosure describes a system for a vehicle comprising: a plurality of sensors, wherein at least one sensor of the plurality of sensors is coupled to a brake assembly of a vehicle; and a brake control unit comprising processing circuitry and coupled to the plurality of sensors and a brake cooling device of the vehicle, wherein the brake cooling device is configured to cool the brake assembly of the vehicle, and wherein the brake control unit is configured to: receive, from the plurality of sensors, signals corresponding to temperatures of the one or more brakes, a status of the vehicle, and a cooling rate of the brake cooling device; and cause the brake cooling device to begin cooling the one or more brakes in response to: a determination that the cooling rate of the brake cooling device satisfies a threshold cooling rate; and one or more of a determination that the temperatures of the one or more brakes satisfies a threshold temperature, or a determination that the status of the vehicle satisfies at least one threshold status of one or more threshold statuses.

In some examples, this disclosure describes a method comprising: receiving, by a brake control unit of a vehicle from one or more sensors of the vehicle, signals corresponding to temperatures of one or more brakes of the vehicle, a status of the vehicle, and a status of a brake cooling device of the vehicle; determining, by the brake control unit, that the status of the brake control unit satisfies a threshold brake control unit status; determining, by the brake control unit, that the received signals satisfy one or more threshold conditions, wherein the one or more threshold conditions comprises one or more of: a threshold brake temperature; or one or more threshold vehicle statuses; and in response to determining that the received signals satisfy the one or more threshold conditions and that the status of the brake control unit satisfies the threshold brake control unit status, causing, by the brake control unit, the brake cooling device to actively cool the one or more brakes.

In some examples, this disclosure describes a computer-readable medium comprising instructions that, when executed, causes processing circuitry of a brake control unit of a vehicle to: receive, from one or more sensors of the vehicle, signals corresponding to temperatures of one or more brakes of the vehicle, a status of the vehicle, and a status of a brake cooling device of the vehicle; determine that the status of the brake control unit satisfies a threshold brake control unit status; determine that the received signals satisfy one or more threshold conditions, wherein the one or more threshold conditions comprises one or more of: a threshold brake temperature; or one or more threshold vehicle statuses; and in response to determining that the received signals satisfy the one or more threshold conditions and that the status of the brake control unit satisfies the threshold brake control unit status, cause the brake cooling device to actively cool the one or more brakes.

The details of one or more examples are set forth in the accompanying drawings and the description below. Other features, objects, and advantages will be apparent from the description and drawings, and from the claims.

DETAILED DESCRIPTION

Figure 1:
FIG. 1 is a block diagram illustrating an example vehicle cooling system as described herein.

The disclosure describes articles, systems, and techniques relating to cooling an assembly comprising a wheel and a brake assembly. The wheel is configured to rotate around a wheel axis. The brake assembly may include a disc stack which includes one or more rotor discs and one or more stator discs. For example, the disc stack may include a plurality of rotor discs interleaved with a plurality of stator discs. The rotor discs are rotationally coupled with the wheel, such that a rotation of the wheel around the wheel axis causes rotation of the rotor discs around the wheel axis. The stator discs are configured to remain substantially stationary relative to the wheel and the rotor discs. The brake assembly is configured to compress the disc stack to cause engagement of friction surfaces on the rotating rotor discs and the stationary stator discs, reducing a rotational speed of the rotor discs around the wheel axis. The rotor discs are configured to engage the wheel, such that the reduction in the rotational speed of the rotor discs causes a reduction in the speed of the wheel.

Engaging the friction surfaces of the rotating rotor discs and stationary stator discs may cause an increase in temperature of the rotor discs, the stator discs, or other components of the brake assembly. In some cases (e.g., following an aircraft landing), it may be desirable to supply a cooling fluid (e.g., a cooling liquid, a cooling gas) to the disc stack or other portions of the brake assembly to reduce the temperature more quickly. An operator of a vehicle may engage a brake cooling system of the vehicle to cool portions of the brake assembly of the vehicle. In some vehicles with brake cooling systems, the operator may be required to manually activate and deactivate the brake cooling system. The requirement for manual operation of brake cooling system may reduce cooling efficiency of the brake assembly (e.g., by cooling the brake assembly in situations where active cooling of the brake assembly is not required, or vice versa) and/or unnecessary increase wear on components of the brake cooling system. In some examples, requiring the operator to activate/deactivate the brake cooling system may lead to an increase delay between use of the brake assembly and active cooling of the brake assembly by the cooling system and/or increased operator distraction.

In examples described herein, a cooling system for a brake assembly of a vehicle is configured to actively cool the brake assembly in response to satisfaction of threshold condition(s). Threshold condition(s) may correspond to a status of the vehicle, a speed of the vehicle, temperature of component(s) of the brake assembly, a status of the cooling system, or the like. By actively cooling the brake assembly in response to satisfaction of threshold condition(s), the cooling system described herein may increase the efficiency of cooling the brake assembly, e.g., by reducing the delay to begin cooling the brake assembly, by reducing unnecessary active cooling of the brake assembly. While the cooling system is described with reference to an aircraft, in other examples, the cooling system can be used with other vehicles, such as terrestrial vehicles, watercraft, unmanned aerial vehicles (UAVs), or the like. The cooling system may be integral to the vehicle.

FIG. 1 is a block diagram illustrating an example vehicle cooling system 100 (also referred to herein as "system 100") as described herein. System 100 may include one or more components disposed within or otherwise coupled to vehicle 102. System 100 may include one or more sensor(s) 108 coupled to wheel(s) 104 of vehicle 102, one or more brake cooling devices 114 coupled to brake assembly 106 of vehicle 102, and a brake control unit (BCU) 112 coupled to sensor(s) 108 and brake cooling device 114. BCU 112 may receive sensed signals from sensor(s) 108 and determine, based at least in part on the sensed signals whether vehicle 102 satisfy one or more threshold conditions. In response to determining that the one or more threshold conditions are satisfied, BCU 112 may send signals to brake cooling device 114 to cause brake cooling device 114 to being active cooling of brake assembly 106, e.g., by delivering a cooling fluid to one or more components of brake assembly 106.

Brake assembly 106 may be configured to interface with wheel(s) 104 of vehicle 102 to slow down or stop vehicle 102, e.g., by slowing down or stopping the rotation of wheel(s) 104. Brake assembly 106 may include a disc stack including one or more rotor discs and one or more stator discs. In other examples, brake assembly 106 may include other components for slowing down or stopping the rotation of wheel(s) 104 of vehicle 102. The disk stack of brake assembly 106 may include a plurality of rotor discs interleaved with a plurality of stator discs. Each brake assembly 106 may be coupled to one or more of wheel(s) 104. The rotor discs may be rotationally coupled with one of wheel(s) 104, such that a rotation of wheel 104 around the wheel axis causes rotation of the rotor discs around the wheel axis. The stator discs may be configured to remain substantially stationary relative to wheel 104 and the rotor discs. Brake assembly 106 may be configured to compress the disc stack to cause engagement of friction surfaces on the rotating rotor discs and the stationary stator discs, reducing a rotational speed of the rotor discs around the wheel axis. The rotor discs are configured to engage wheel 104, such that the reduction in the rotational speed of the rotor discs causes a reduction in the speed of wheel 104.

Sensor(s) 108 may be coupled to wheel(s) 104 brake assembly 106, and/or brake cooling device 114 and may be configured to sense signals from wheel(s) 104 brake assembly 106 and/or brake cooling device 114. In some examples, one or more of sensor(s) 108 may be coupled to wheel(s) 104 and may sense signals corresponding to rotation of wheel(s) 104, e.g., based on visual signals, based on electrical signals from magnetic elements of sensor(s) 108, or the like. In some examples, where vehicle 102 is an aircraft, sensor(s) 108 may include one or more sensors of a weight on wheels (WOW) system configured to sense a force acting on one or more of wheel(s) 104. In some examples, one or more of sensor(s) 108 (e.g., temperature sensor(s) 110)) may be coupled to one or more components of brake assembly 106 (e.g., to one or more rotor discs, to one or more stator discs). In such examples, temperature sensor(s) 110 may sense signals corresponding to temperature of one or more components of brake assembly 106. Temperature sensor(s) 110 may include, but are not limited to, a brake temperature probe.

BCU 112 may be coupled to sensor(s) 108, brake cooling device 114, communications circuitry 116, memory 118, and user interface (UI) 120 of vehicle 102. BCU 112 may receive information from sensor(s) 108, communications circuitry 116, memory 118, and/or UI 120 and determine whether vehicle 102 satisfies one or more threshold conditions based on the received information. If vehicle 102 satisfies the one or more threshold conditions, BCU 112 may transmit signals to brake cooling device 114 to cause brake cooling device 114 to begin cooling brake assembly 106. In some examples, if BCU 112 determines that vehicle 102 no longer satisfies the one or more threshold conditions while brake cooling device 114 is cooling brake assembly 106, BCU 112 may transmit signals to brake cooling device 114 to cause brake cooling device 14 to cease cooling brake assembly 106.

BCU 112 may include processing circuitry 113. Processing circuitry 113 may retrieve and execute instructions from memory 118 to determine satisfaction of threshold condition(s) and control brake cooling device 114. Processing circuitry 113 may be implemented in any of a variety of types of solid state circuit elements, such as CPUs, CPU cores, GPUs, digital signal processors (DSPs), application-specific integrated circuitry (ASICs), mixed-signal integrated circuits, field programmable gate arrays (FPGAs), microcontrollers, programmable logic controllers (PLCs), programmable logic devices (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

Processing circuitry 113 may determine values for one or more parameters of vehicle 102. Parameters may include, but are not limited to, speed of vehicle 102, status of vehicle 102 (e.g., WOW status of vehicle 102), temperature of components of brake assembly 106, or status of brake cooling device 114. Processing circuitry 113 may determine a speed of vehicle 102 based at least in part on signals from sensor(s) 108 indicating a rotational speed of wheel(s) 104, signals received from an external navigation/guidance system (e.g., via communications circuitry 116) indicating a speed of vehicle 102, or the like. In some examples, processing circuitry 113 determines that vehicle 102 is on the ground or airborne based at least in part on a signal from a WOW sensor of sensor(s) 108 indicating a force (e.g., weight) on wheel(s) 104. Processing circuitry 113 may determine the temperature of components of brake assembly 106 based on sensed signals from temperature sensor(s) 110, the sensed signals corresponding to the temperature of components of brake assembly 106.

The status of vehicle 102 may include, but are not limited to, whether vehicle 102 is stationary or whether vehicle 102 is airborne. Processing circuitry 113 may determine the status of vehicle 102 based at least in part on signals from sensor(s) 108 or from an external navigation/guidance system via communications circuitry 116. The status of brake cooling device 114 may include, but are not limited to, a cooling rate of brake cooling device 114 or a health of one or more components of brake cooling device 114. Processing circuitry 113 may determine the cooling rate of brake cooling device 114 based on temperature data of brake assembly 106 obtained via temperature sensor(s) 110 while brake cooling device 114 actively cools brake assembly 106 (e.g., at a time prior to the current time). Processing circuitry 113 may determine the health of one or components of brake cooling device 114 based on the cooling rate of brake cooling device 114 and/or a period of time since recorded maintenance of brake cooling device 114. Processing circuitry 113 may retrieve the prior maintenance time of brake cooling device 114 from memory 180, from an external storage device/system via communications circuitry 116, or from user input via UI 120.

Processing circuitry 113 may compare values for one or more parameters against threshold conditions for the parameters. Processing circuitry 113 may determine that vehicle 102 satisfies a threshold conditions (e.g., a threshold speed) based on a determination that vehicle 102 is traveling less than or equal to a threshold speed (e.g., a wheel speed of vehicle 102 is less than or equal to the threshold speed). Processing circuitry 113 may determine that vehicle 102 satisfies a threshold brake assembly temperature based on a determination that a temperature of brake assembly 106 is greater than or equal to a threshold temperature. Processing circuitry 113 may determine that vehicle 102 is in a threshold vehicle status (e.g., on the ground), and/or that brake cooling device 114 is in a threshold brake cooling device status (e.g., has a cooling rate greater than or equal to a threshold cooling rate, has been maintained within a time period prior to the current time less than or equal to a threshold period of time).

Processing circuitry 113 may transmit a signal to brake cooling device 114 to cause brake cooling device 114 to begin cooling of brake assembly 106 based on satisfaction of one or more different threshold conditions, each threshold condition corresponding to a different parameter. Processing circuitry 113 may transmit the signal to activate brake cooling device 114 based on satisfaction of the threshold status of brake cooling device 114 and one or more of the threshold speed, the threshold brake assembly temperature, or the threshold status for vehicle 102. In some examples, the threshold status of brake cooling device 114 may be required to be satisfied in addition to any combination of the other threshold conditions, e.g., to inhibit unintended operation of brake cooling device 114 when brake cooling device 114 is damaged, worn, or otherwise incapable of effectively cooling brake assembly 106.

Brake cooling device 114 may be configured to transmit a cooling fluid to brake assembly 106 (e.g., from a fluid source, from external to vehicle 102). The cooling fluid may be a liquid (e.g., a liquid coolant) or a gas (e.g., air). Brake cooling device 114 may include, but are not limited to, a cooling fan assembly, a cooling pump assembly, or the like. Brake cooling device 114 may include a motor configured to rotate or operator a fan or a pump of brake cooling device 114 to cool brake assembly 106. Brake cooling device 114 may cool the fluid prior to transmission of the fluid to brake assembly 106. Brake cooling device 114 may transmit the fluid into brake assembly 106 in response to a first signal from BCU 112 and may cease transmission of the fluid in response to a second signal from BCU 112. The second signal may be different from the first signal. In some examples, brake cooling device 114 forms a complete circuit for the fluid. In such examples, brake cooling device 114 may circulate the fluid into brake assembly 106, out of brake assembly 106 (e.g., into a fluid reservoir, into a compressor), and then back into brake assembly 106 to continuous cool brake assembly 106. Vehicle 102 may include a single brake cooling device 114 coupled to brake assemblies 106 of wheels 104 or two or more brake cooling devices 114. In such examples with two or more brake cooling devices 114, each brake cooling device 114 may be fluidically coupled to a single brake assembly 106 or two or more brake assemblies 106.

Communications circuitry 116 may receive signals from and/or transmit signals to one or more sources. The one or more sources may include, but are not limited to, vehicle 102, one or more other vehicles, a base station, a traffic controller, or the like. In some examples, where BCU 112 is disposed within and/or includes components of vehicle 102, processing circuitry 113 may retrieve the signals directly from components (e.g., sensor(s) 108) on vehicle 102. Communications circuitry 116 may communicate with the one or more sources via wired or wireless communications. Wireless communications may be performed by one or more wireless transmission protocols including, but are not limited to, Wi-fi, Bluetooth®, radio communications, infrared communication, Wireless Avionics Intra-Communications (WAIC), or any other wireless transmission protocol.

Communications circuitry 116 may receive signals indicative of a speed or statue of vehicle 102. In some examples communications circuitry 116 may receive signals indicating a position of vehicle 102 and processing circuitry 113 may determine a speed and/or status of vehicle 102 based on the received signals, e.g., based on changes in the position of vehicle 102 over time. The locations may be determined via one or more systems including, but are not limited to a Global Navigation Satellite System (GNSS), Global Positioning System (GPS), a Light Detection Ranging (LiDAR) system, or any other system usable by a vehicle to determine a location of the vehicle. The location may be absolute (e.g., relative to a longitude and a latitude) or relative (e.g., relative to another vehicle, relative to a landmark such as a runway).

Vehicle 102 may include one or more navigation systems for determining movement of vehicle 102 (e.g., altitude, heading, acceleration, velocity, turn rate) such as an inertial navigation system (INS). In some examples, vehicle 102 may determine movement of the vehicle based on changes in the locations of the vehicle, e.g., as detected by the GNSS. vehicle 102 may monitor (e.g., constantly, periodically) the location and movement of the vehicle 102 via the one or more navigation systems. The one or more navigation systems may be connected to system 100, e.g., via a wired connection to BCU 112, via a wireless communication to communications circuitry 116.

Memory 118 may store program instructions which are executable by processing circuitry 113. When executed by processing circuitry 113, such program instructions may cause processing circuitry 113 to perform the functionalities attributed to it herein. The program instructions may be embodied in software and/or firmware, Memory 118 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

UI 120 may be configured to receive input from an operator of vehicle 102 and transmit information to the operator of vehicle 102. UI 120 may receive input in the form of visual, tactile, or auditory signals. UI 120 may output information to the operator in the form of visual, tactile, or auditory signals. Processing circuitry 113 may cause UI 120 to output notifications to the operator in response to processing circuitry 113 causing brake cooling device 114 to begin cooling brake assembly 106, to cease cooling brake assembly 106, and/or while brake cooling device 114 is cooling brake assembly 106. UI 120 may be configured to receive input from operator to activate or deactivate brake cooling device 114. Such input may override determinations made by processing circuitry 113 and may cause processing circuitry 113 to transmit signals to brake cooling device 114 in accordance with the instructions received by UI 120. UI 120 may include, but are not limited to, digital displays, microphones, speakers, cameras, touchpads, buttons, keypads, keyboards, knobs, levers, switches, or the like.

Figure 2:
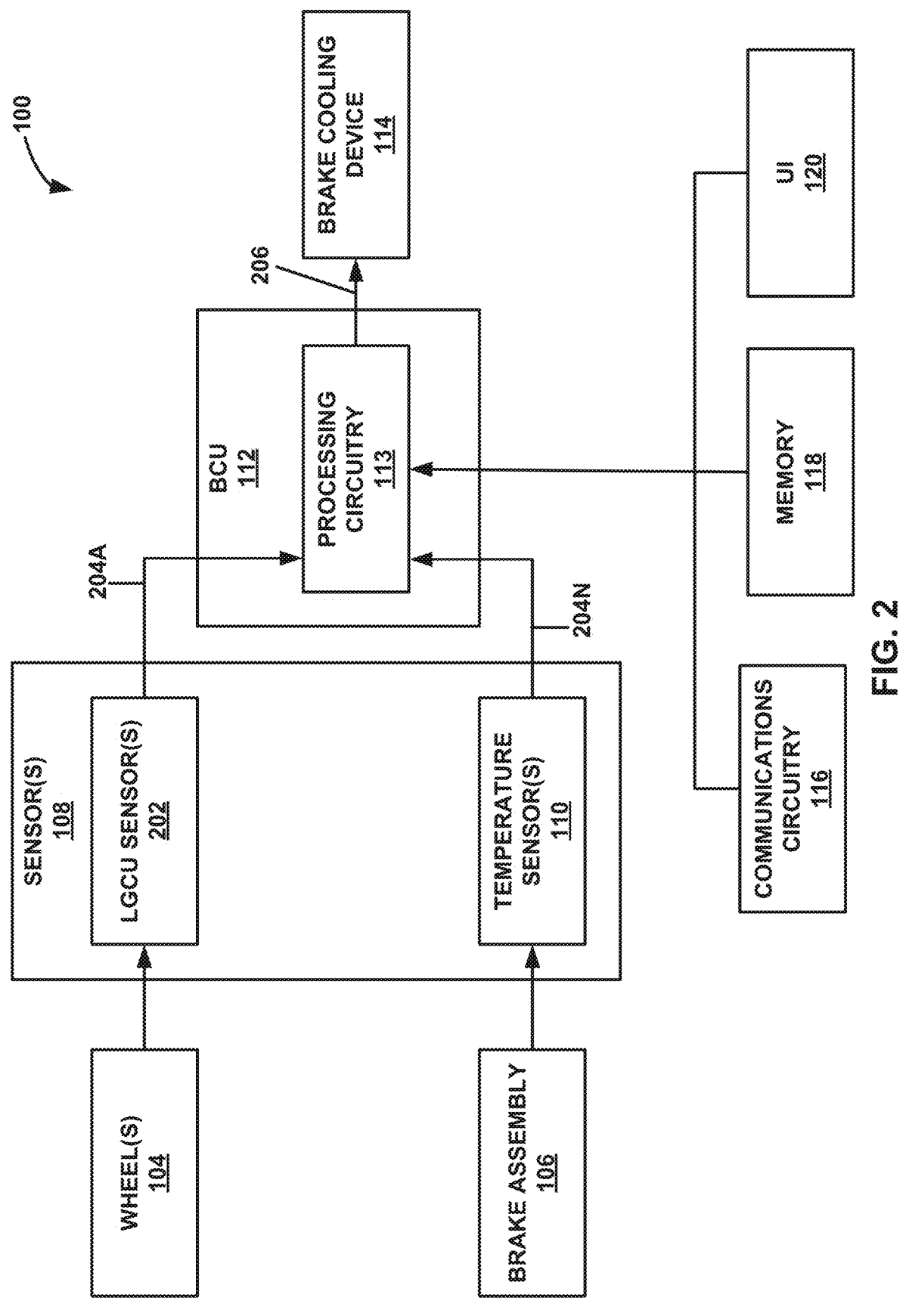
FIG. 2 is a block diagram illustrating another example view of the vehicle cooling system of FIG. 1.

FIG. 2 is a block diagram illustrating another example view of system 100 of FIG. 1. FIG. 2 illustrates one example of the transmission of signals between components of system 100 and/or components of vehicle 102 to control brake cooling device 114 to cool brake assembly 106. In other examples, system 100 may transmit signals along other pathways between the components of system 100 and/or components of vehicle 102 to control brake cooling device 114.

Wheel(s) 104 and brake assembly 106 may be coupled to one or more of sensor(s) 108. In some examples, where vehicle 102 is an aircraft or aerial vehicle (e.g., a UAV), wheel(s) 104 may be coupled to a landing gear control unit (LGCU) of vehicle 102. Vehicle 102 may control movement of a landing gear structure of vehicle 102, including wheel(s) 104). LGCU may include one or more LGCU sensors 202 configured to monitor wheel(s) 104, e.g., movement of wheel(s) 104, rotation of wheel(s) 104, weight on wheel(s) 104. LGCU sensors 202 may include, but are not limited to, magnetic, optical, or pressure sensors. In some examples, LGCU sensor(s) 202 includes one or more WOW sensors. Brake assembly 106 may be coupled to temperature sensor(s) 110, e.g., as previously described herein.

Sensor(s) 108 may be communicatively coupled to BCU 112 (e.g., to processing circuitry 113 of BCU 112). In some examples, as illustrated in FIG. 2, sensor(s) 108 may be coupled to BCU 112 via cables 204A-N(Collectively referred to herein as "cables 204"). Cables 204 may include one, two, or three or more separate cables 204. In some examples, sensor(s) 108 may be wirelessly coupled to BCU 112, e.g., via communications circuitry 116.

Processing circuitry 113 may receive sensed signals from sensor(s) 202, e.g., via cables 204. In some examples, processing circuitry 113 receives at least a portion of the sensed signals from communications circuitry 116 and/or from UI 120. Processing circuitry 113 may determine values for parameters of vehicle 102 based on the received sensed signals from sensor(s) 202, communication circuitry 116, and/or UI 120. For example, processing circuitry 113 is configured to determine one or more of a status of vehicle 102 (e.g., a WOW status of vehicle 102), a status of brake cooling device 114, speed (e.g., a wheel speed) of vehicle 102, and/or a temperature of component(s) of brake assembly 106 based on the received sensed signals.

Processing circuitry 113 may retrieve or receive threshold condition(s) for parameters from communications circuitry 116, memory 118, and/or UI 120. The threshold condition(s) may be stored in memory 118 of system 100, may be stored in an external device/storage, and/or may be manually entered (e.g., by an operator of vehicle 102). Processing circuitry 113 may compare the determined values for the parameters of vehicle 102 against the threshold conditions and determine whether one or more threshold conditions are satisfied. In some examples, processing circuitry 113 determines whether a specific combination of threshold conditions have been satisfied. For example, processing circuitry 113 may determine a threshold status of brake cooling device 114 is satisfied and one or more other threshold conditions have been satisfied.

Each specific combination of threshold conditions is referred to herein as a "set of threshold conditions." Each set of threshold conditions may include one, two, or three or more threshold conditions. Within each set of threshold conditions, the individual threshold conditions may be unique and/or may each be directly to a different parameter of vehicle 102. Processing circuitry 113 may analyze each set of threshold conditions separately to determine if the determined parameter values of vehicle 102 satisfy at least one set of threshold conditions.

Processing circuitry 113 may control brake cooling device 114 to begin cooling brake assembly 106 in response to a determination that one or more threshold conditions have been satisfied and/or at least one set of threshold conditions have been satisfied. Processing circuitry 113 may control brake cooling device 114 to cease cooling braking assembly 106 in response to a determination that none of the threshold conditions and/or none of the sets of threshold conditions have been satisfied. Processing circuitry 113 of BCU 112 may be coupled to brake cooling device 114 via a cable 206. In some examples, processing circuitry 113 may be wirelessly coupled to brake cooling device 114 via communications circuitry 116. Processing circuitry 113 may transmit signals to brake cooling device 114 along cable 206 or via communications circuitry 116 to control brake cooling device 114. In some examples, where brake cooling device 114 includes or is coupled to one or more sensor(s) configured to sense signals from components of brake cooling device 114, processing circuitry 113 may receive the sensed signals from the one or more sensor(s) through communications circuitry 116 and/or cable 206.

Some example vehicles may include a BCU that is electrically separate from a brake cooling device. In such examples, the brake cooling device of a vehicle is configured to be manually operated by the operator of the vehicle. A manufacturing assembly may insert cable 206 into the vehicle to connect the BCU of the vehicle to the brake cooling device of the vehicle. The insertion of cable 206 may be the only physical modification required to existing vehicles to allow the cooling systems of the existing vehicles to perform the processes described herein. The BCU of the example vehicle may receive and execute instructions to perform the example processes described herein and may transmit the example signals described herein to the brake cooling device along cable 206, e.g., to automatically control the brake cooling device of the vehicle.

Figure 3:
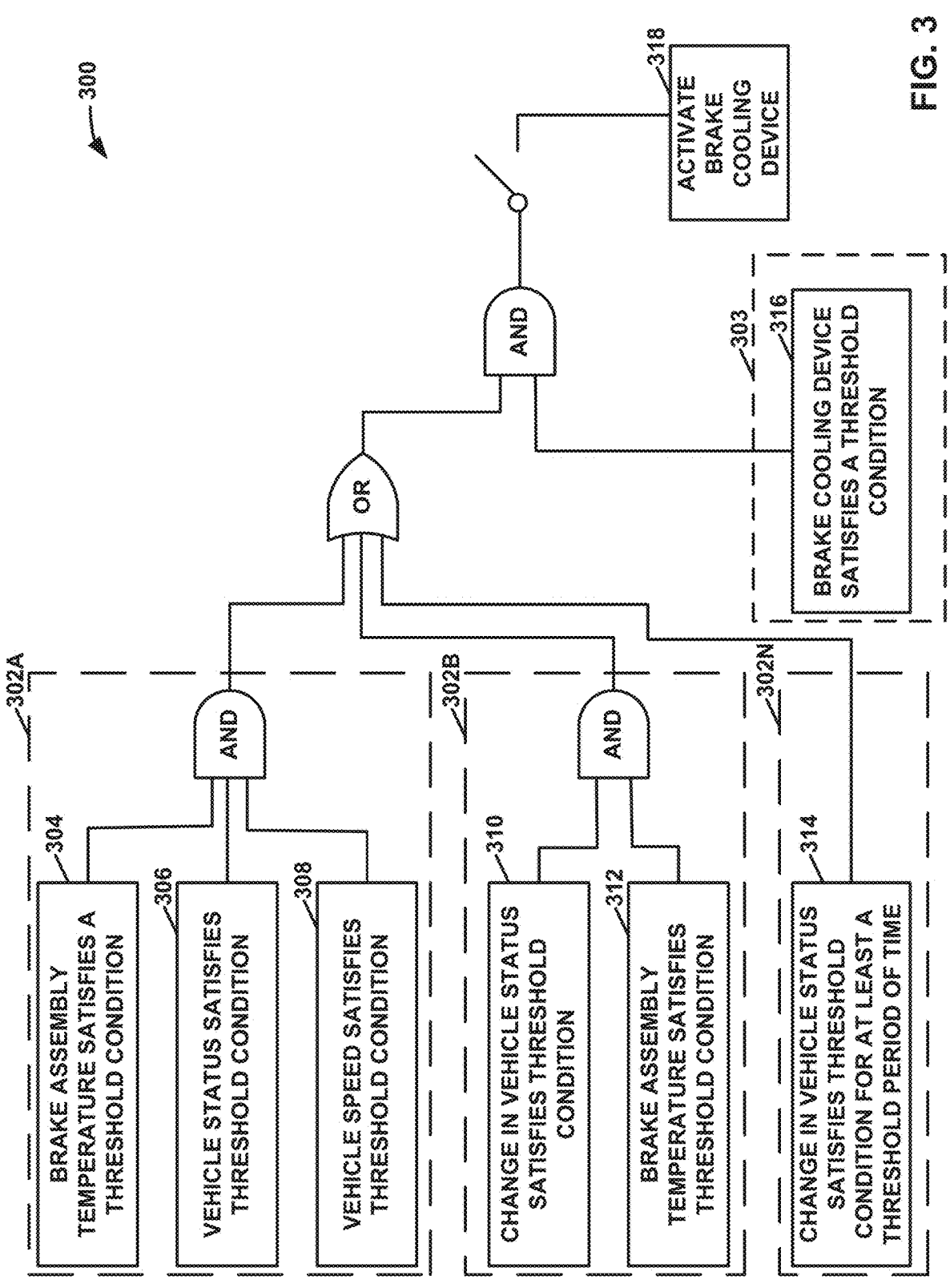
FIG. 3 is a block diagram illustrating an example decision tree of the vehicle cooling system of FIG. 1.

FIG. 3 is a block diagram illustrating an example decision tree 300 of system 100 of FIG. 1. As illustrated in FIG. 3, system 100 may activate brake cooling device (318) in response to satisfaction of at least one set of threshold conditions. While decision tree 300 illustrates three example sets of threshold conditions, it is appreciated that this is a non-limiting list of example sets of threshold conditions. Other example sets of threshold conditions may include any another combination of one, two, or three or more threshold conditions as described herein.

Each set of threshold conditions may include one or more subsets of threshold conditions. For example, as illustrated in decision tree 300, each set of threshold conditions may include one of subsets 302A-N (collectively referred to herein as "subsets 302") and subset 303. Processing circuitry 113 may determine that a subset of threshold conditions (e.g., subsets 302, subset 303) is satisfied based on a determination that all threshold conditions within the subset have been satisfied. Processing circuitry 113 may determine that a set of threshold conditions have been satisfied based on satisfaction of all subsets within the set of threshold conditions. For example, as illustrated in decision tree 300, processing circuitry 113 may determine that a set of threshold conditions have been satisfied based on satisfaction of the threshold conditions of any of subsets 302 and of subset 303.

Subset 302A may include threshold conditions 304, 306, and 308. Threshold conditions 304, 306, and 308 may correspond to a threshold brake assembly temperature, a threshold vehicle status, and a threshold vehicle speed, respectively. Processing circuitry 113 may determine that subset 302A has been satisfied based on a determination that the parameter values of vehicle 102 satisfies each of threshold conditions 304, 306, and 308.

Processing circuitry 113 may determine that threshold condition 304 is satisfied based on a determination that a brake temperature of components of brake assembly 106 satisfies threshold condition 304, e.g., is greater than or equal to a threshold brake assembly temperature. The threshold brake assembly temperature may be up to about 500° C. (e.g., about 932° F.). In some examples, the threshold brake assembly temperature is up to about 100° C. (e.g., about 212° F.). The threshold brake assembly temperature may vary based on other parameter values. For example, the threshold brake assembly temperature may be lower (e.g., at about 100° C.) when vehicle 102 is moving. In another example, the threshold brake assembly temperature may be higher (e.g., at about 500° C.) immediately following landing of vehicle 102.

Processing circuitry 113 may determine that threshold condition 306 is satisfied by determining that a status of vehicle 102 matches threshold status of threshold condition 306. The status of vehicle 102 may correspond to a WOW status of vehicle 102. The threshold status of vehicle 102 may be an "on the ground" WOW status. Processing circuitry 113 may determine the WOW status based on a magnitude of weight on wheel(s) 104 and compare the determined WOW status to the threshold status of threshold condition 304 to determine whether the determined WOW status matches the threshold status. In some examples, processing circuitry may determine the status of vehicle 102 based on location, speed, and/or altitude information from a navigation/guidance system of vehicle 102.

Processing circuitry 113 may determine that threshold condition 308 is satisfied by determining that a speed of vehicle 102 satisfies a threshold speed of threshold condition 308, e.g., is less than equal to the threshold speed. Processing circuitry 113 may determine the speed of vehicle 102 based on a rate of revolution of wheel(s) 104, based on changes in position of vehicle 102 from the navigation/guidance system, or the like. The threshold speed may be up to about 30 knots (e.g., about 55.5 kilometers/hour (km/hr) or about 34.5 miles per hour (mph)).

Subset 302B may include threshold conditions 310 and 312. Threshold conditions 310 and 312 may correspond to a threshold change in status of vehicle 102 and a threshold brake assembly temperature, respectively. Processing circuitry 113 may determine that subset 302B has been satisfied based on a determination that the parameter values of vehicle 102 satisfies each of threshold conditions 310 and 312.

Processing circuitry 113 may determine that threshold condition 310 is satisfied based on a determination that a status of vehicle 102 changes from a first threshold status to a second threshold status (e.g., from "in air" to "on the ground"). Processing circuitry 113 may determine a change in status of vehicle 102 based on a change in WOW status. Processing circuitry 113 may determine a change in WOW status based at least in part on change in weight on wheel(s) 104. In some examples, processing circuitry may determine a change in status of vehicle 102 based on location, speed, and/or altitude information from a navigation/guidance system of vehicle 102. Processing circuitry 113 may determine whether the threshold brake assembly temperature for threshold condition 312 has been satisfied in accordance with the example processes previously described herein.

Subset 302N may include threshold condition 314. In other examples, subset 302N may include one or more threshold conditions (e.g., one or more of threshold conditions 304-312) in addition to threshold condition 314. Threshold condition 314 may correspond to a status of vehicle 102 that satisfies a threshold status of vehicle 102 for at least a threshold period of time. Processing circuitry 113 may determine that threshold condition 314 has been satisfied based on a determination that the status of vehicle 102 has been changed to the threshold status and has matched the threshold status for at least a threshold period of time. The threshold period of time may be up to five minutes. Processing circuitry 113 may determine a status of vehicle 102 in accordance with one or more example processes previously described herein and compare the status against a threshold status. Based on a determination that the determined status matches the threshold status, processing circuitry 113 may determine whether vehicle 102 has been in the determined status for at least the threshold period of time prior to the current time (e.g., for at least five minutes prior to the current time). Processing circuitry 113 may determine that threshold condition 314 is satisfied based on a determination that vehicle 102 has assumed the threshold status for a time period greater than or equal to the threshold period of time.

In response to a determination that one or more of subsets 302 have been satisfied, processing circuitry 113 may determine whether subset 303 has been satisfied. Subset 303 may include threshold condition 316. In some examples, subset 303 includes one or more of threshold conditions 302-314. In some examples, each set of threshold conditions only includes one of subsets 302 and threshold condition 316 is included within each of subsets 302.

Threshold condition 316 corresponds to a threshold status of brake cooling device 114. In some examples, processing circuitry 113 determines that brake cooling device 114 satisfies the threshold status of brake cooling device 114 based on a determination that brake cooling device 114 cooled brake assembly 106 at a rate greater than or equal to a threshold cooling rate during a previous application of brake cooling device 114. Processing circuitry 113 may determine the rate of cooling of brake cooling device 114 based on changes in temperature of brake assembly 106 over time during the prior application of brake cooling device 114. The threshold cooling rate may be up to about 10° C. per minute (° C./min). In some examples, processing circuitry 113 determines that brake cooling device 114 satisfies the threshold status of brake cooling device 114 based on a determination that brake cooling device 316 has been maintained within a threshold period of time prior to the current time. The threshold period of time may be up to about 25 minutes.

Figure 4:
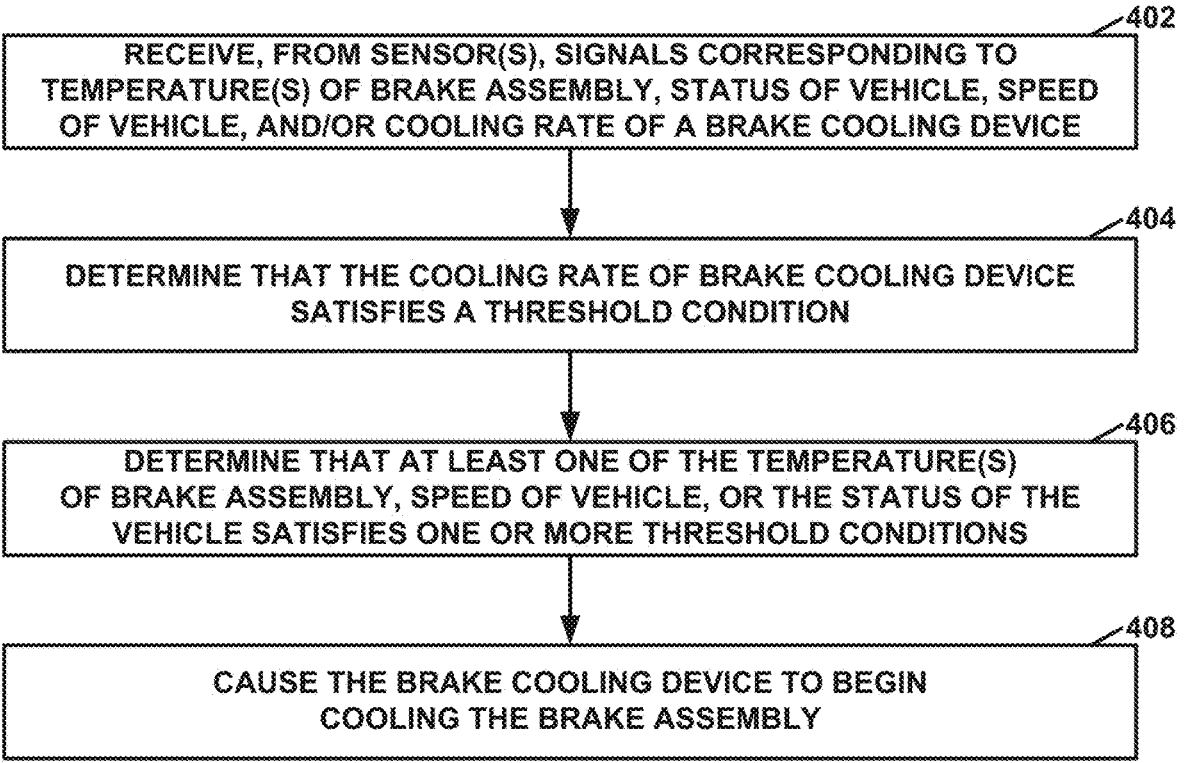
FIG. 4 is a flow chart illustrating an example process of cooling a brake assembly of a vehicle cooling system.

FIG. 4 is a flow chart illustrating an example process of cooling brake assembly 106 of a vehicle 102. While FIG. 4 is primarily described below with reference to vehicle 102 being an aircraft, vehicle 102 may be of any other type of vehicle described herein. Additionally, while the steps of FIG. 4 are primarily described below in the order illustrated in FIG. 4, system 100 may perform the steps of FIG. 4 in other orders to cool brake assembly 106.

System 100 may receive, from sensor(s) 108, signals corresponding to temperature of brake assembly 106, speed of vehicle 102, status of vehicle 102, and cooling rate of brake cooling device 114 (402). Sensor(s) 108 may be disposed within vehicle 102, within one or more system of vehicle 102 (e.g., within brake assembly 106 of vehicle 102, within a LGCU of vehicle 102), and/or may be external to vehicle 102. Sensor(s) 108 may include temperature sensor(s) 110, LGCU sensor(s) 202, WOW sensor(s), and/or any other sensors/sensing devices described herein. Processing circuitry 113 of BCU 112 of system 100 may receive the sensed signals via communications circuitry 116, UI 120, and/or cables coupling sensor(s) 108 to BCU 112 (e.g., cables 204). Processing circuitry 113 may determine the temperature of brake assembly 106, the status of vehicle 102 (e.g., the WOW status of vehicle 102), and the cooling rate of brake cooling device 114 based on the received sensed signals.

System 100 may determine that the cooling rate of brake cooling device 114 satisfies a threshold condition (404). System 100 may determine that at least one of the temperature of brake assembly 106, speed of vehicle 102, or the status of vehicle 102 satisfies one or more threshold conditions (406). Parameters of vehicle 102 may include, but are not limited to, the temperature of brake assembly 106, the status of vehicle 102, and/or the cooling rate of brake cooling device 114. Processing circuitry 113 may receive/retrieve the threshold conditions from memory 118 of system 100 and/or via from an external source (e.g., from a storage device/system external to vehicle 102, from an operator of vehicle 102) via communications circuitry 116 and/or UI 120. Processing circuitry 113 may compare the determined value of each parameter against a threshold value corresponding to the parameter to determine whether vehicle 102 satisfies the threshold condition for the parameter.

Processing circuitry 113 may determine whether a set of threshold conditions have been satisfied by vehicle 102. In some examples, the set of threshold conditions includes a threshold condition corresponding to the cooling rate of brake cooling device 114 and one or more of a threshold condition corresponding to the temperature of brake assembly 106 or a threshold condition corresponding to the status of vehicle 102.

Processing circuitry 113 may compare the temperature of brake assembly 106 to a threshold brake assembly temperature to determine whether the temperature satisfy a threshold condition. In such examples, processing circuitry 113 may determine that the threshold condition has been satisfied based on a determination that the temperature of brake assembly 106 is greater than or equal to the threshold brake assembly temperature.

Processing circuitry 113 may compare the status of vehicle 102 (e.g., a WOW status of vehicle 102) against a threshold vehicle status to determine whether the status of vehicle 102 satisfies the corresponding threshold condition (e.g., whether the status of vehicle 102 matches the threshold vehicle status. In some examples, the threshold condition corresponding to the status of vehicle 102 may be a threshold change in vehicle status. In such examples, processing circuitry 113 may determine that the threshold condition has been satisfied based on a determination that the status of vehicle 102 changed from a first threshold status (e.g., "in air") to a second threshold status (e.g., "on the ground").

Processing circuitry 113 may compare the cooling rate of brake cooling device 114 against a threshold cooling rate to determine whether the cooling rate satisfies the corresponding threshold condition. For example, processing circuitry 113 may determine that the threshold condition is satisfied based on a determination that the cooling rate of brake cooling device 114 is greater than or equal to the threshold cooling rate.

System 100 may cause brake cooling device 114 to begin cooling brake assembly 106 (408). Processing circuitry 113 may determine that each threshold condition within a set of threshold conditions have been satisfied (e.g., that the parameter values of vehicle 102 satisfy the threshold cooling rate and one or more of the threshold brake assembly temperature or the threshold vehicle status. Processing circuitry 113 may transmit a signal to brake cooling device 114 in response to the satisfaction of a set of threshold conditions to cause brake cooling device 114 to begin active cooling of brake assembly 106 (e.g., via activation of a pump, fan, or other fluid-transmission device of brake cooling device 114). In some examples, processing circuitry 113 compares parameter values to two or more sets of threshold conditions, wherein each set of threshold conditions contains at least one threshold condition distinct from one or more of sets of threshold conditions. Processing circuitry 113 may cause brake cooling device 114 to begin cooling brake assembly 106 in response to satisfaction of one or more of the sets of threshold conditions.

Processing circuitry 113 may continue to receive signals from sensor(s) 108 and compare the determined parameter values (e.g., based on the received signals) against the sets of threshold conditions while brake cooling device 114 is cooling brake assembly 106. In response to determining that none of the sets of threshold conditions have been satisfied, processing circuitry 113 may transmit another signal to brake cooling device 114 to cease cooling of brake assembly 106.

Figure 5:
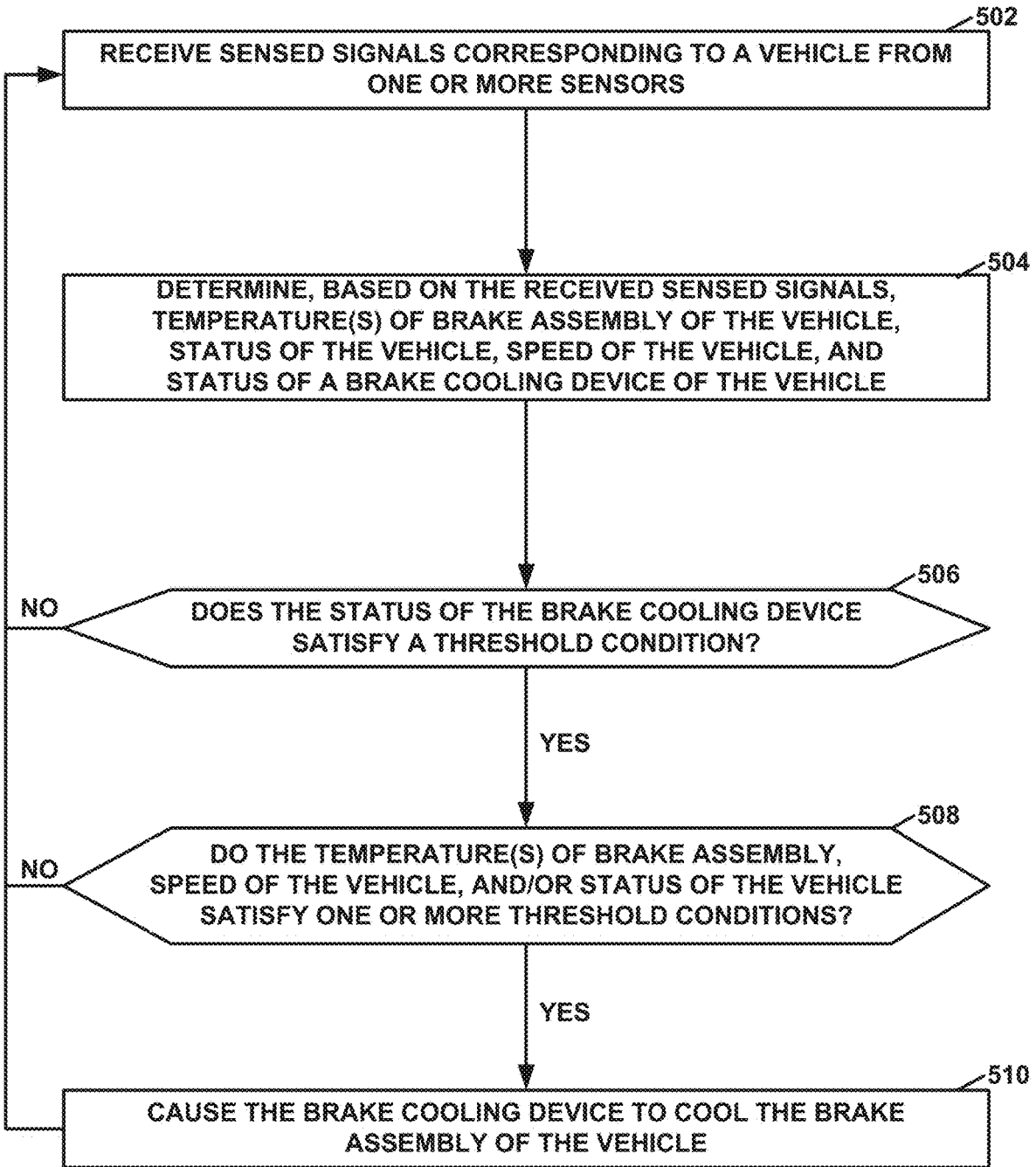
FIG. 5 is a flow chart illustrating another example process of cooling a brake assembly of a vehicle cooling system.

FIG. 5 is a flow chart illustrating another example process of cooling a brake assembly of a vehicle system. While FIG. 5 is primarily described below with reference to vehicle 102 being an aircraft, vehicle 102 may be of any other type of vehicle described herein. Additionally, while the steps of FIG. 5 are primarily described below in the order illustrated in FIG. 5, system 100 may perform the steps of FIG. 5 in other orders to cool brake assembly 106.

System 100 may receive sensed signals corresponding to vehicle 102 from one or more sensor(s) 108 (502). System

100 may determine, based on the received sense signals, temperature of brake assembly 106 of vehicle 102, status of vehicle 102, speed of vehicle 102, and status of brake cooling device 114 of vehicle 102 (504). System 100 may perform steps 502, 504 in accordance with other example processes previously described herein, e.g., with respect to FIG. 4.

System 100 may determine whether the status of brake cooling device 114 satisfies a threshold condition (506). The threshold condition for the status of brake cooling device 114 may include, but are not limited to, a threshold cooling rate of brake cooling device 114 and/or a threshold period of time since prior maintenance of brake cooling device 114. The status of brake cooling device 114 may indicate a cooling rate of brake cooling device 114 and/or a period of time since a prior maintenance session or brake cooling device 114. Processing circuitry 113 may compare the status of brake cooling device 114 against the threshold condition to determine whether the status of brake cooling device 114 satisfies the threshold condition.

Based on a determination that the status of brake cooling device 114 does not satisfy the threshold condition, ("NO" branch of 506), system 100 may continue to receive sensed signals corresponding to vehicle 102 from one or more sensors 108 (502). System 100 may periodically or regularly perform steps 502-506 until system 100 determines that temperature of brake assembly 106, speed of vehicle 102, and/or status of vehicle 102 do not satisfy any of the one or more threshold conditions and/or until system 100 receives instructions (e.g., via communications circuitry 116, via UI 120) to terminate the process.

Based on a determination that the status of brake cooling device satisfies the threshold condition ("YES" branch of 506), system 100 may determine whether the temperature of brake assembly 106, speed of vehicle 102, and/or a status of vehicle 102 satisfies one or more threshold conditions (508). Processing circuitry 113 may compare a value of a parameter of vehicle 102 (e.g., temperature of brake assembly 106, speed of vehicle 102, status of vehicle 102), to a corresponding threshold value to determine whether vehicle 102 satisfies a threshold condition. For example, processing circuitry 113 may compare the temperature of brake assembly 106 to a threshold brake assembly temperature, the speed of vehicle 102 to a threshold speed, and/or a status of vehicle 102 to a threshold status and/or a threshold change in status to determine whether vehicle 102 satisfies one or more threshold conditions. Processing circuitry 113 may make such comparisons in accordance with the example processes and techniques previously described herein.

In response to determining that temperature of brake assembly 106, speed of vehicle 102, and/or status of vehicle 102 do not satisfy any of the one or more threshold conditions ("NO" branch of 508), system 100 may continue to receive sensed signals corresponding to vehicle 102 from one or more sensors (502). System 100 may periodically or regularly perform steps 502-508 illustrated in FIG. 5 until system 100 determines that temperature of brake assembly 106, speed of vehicle 102, and/or status of vehicle 102 do not satisfy any of the one or more threshold conditions and/or until system 100 receives instructions (e.g., via communications circuitry 116, via UI 120) to terminate the process.

In response to determining that temperature of brake assembly 106, speed of vehicle 102, and/or status of vehicle 102 do not satisfy any of the one or more threshold conditions ("YES" branch of 508), system 100 may cause brake cooling device 114 to cool brake assembly 106 of vehicle 102. For example, processing circuitry 113 of system 100 may transmit a signal to brake cooling device 114 to cause brake cooling device 114 to begin active cooling brake assembly 106. System 100 may continue to receive sensed signals from sensor(s) 108 (502) and perform steps 502-510 illustrated in FIG. 5 until system 100 determines that temperature of brake assembly 106, speed of vehicle 102, and/or status of vehicle 102 do not satisfy any of the one or more threshold conditions and/or until system 100 receives instructions (e.g., via communications circuitry 116, via UI 120) to terminate the process.

Figure 6:
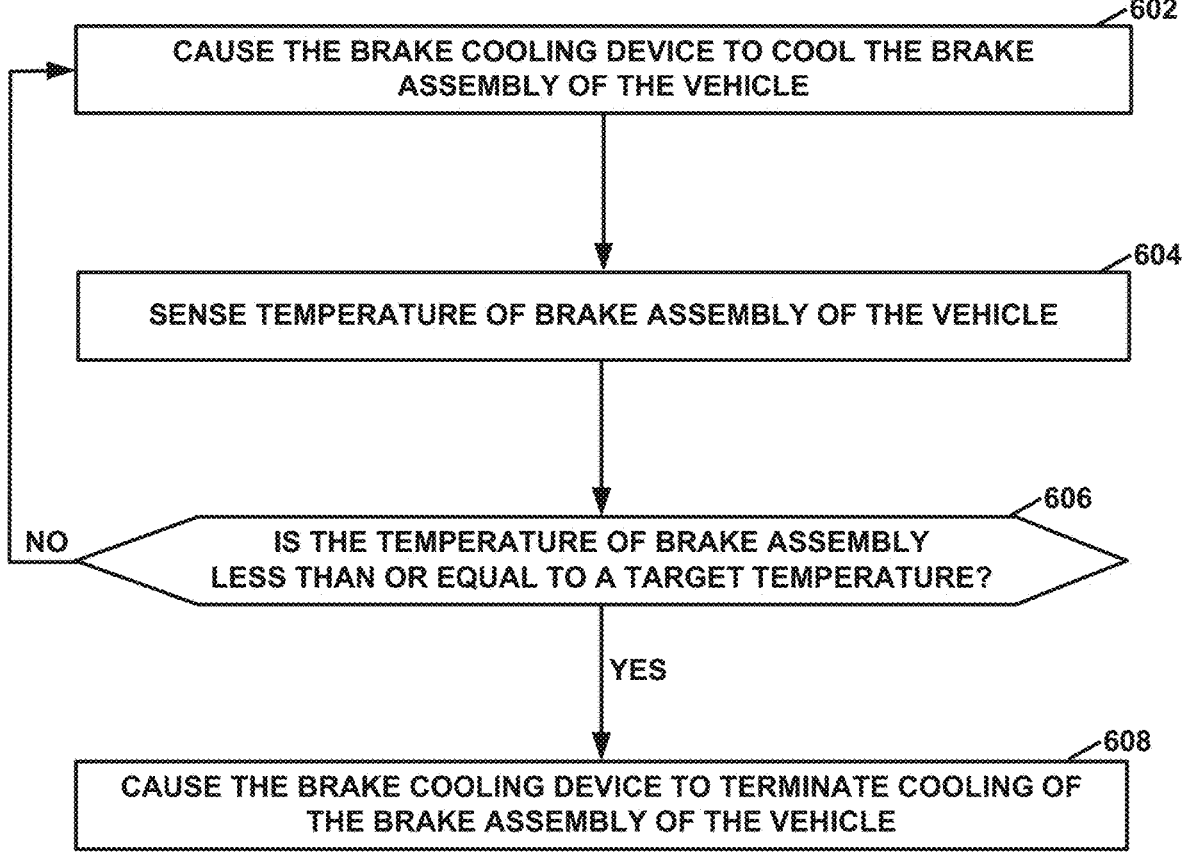
FIG. 6 is a flow chart illustrating an example process of terminating the cooling of a brake assembly of a vehicle by a brake cooling device of a vehicle cooling system.

FIG. 6 is a flow chart illustrating an example process of terminating the cooling of brake assembly 106 of vehicle 102 by brake cooling device 114 of system 100. While FIG. 6 is primarily described below with reference to vehicle 102 being an aircraft, vehicle 102 may be of any other type of vehicle described herein. Additionally, while the steps of FIG. 6 are primarily described below in the order illustrated in FIG. 6, system 100 may perform the steps of FIG. 6 in other orders to cool brake assembly 106.

System 100 may cause brake cooling device 114 to cool brake assembly 106 of vehicle 102 (602) in accordance with one or more example processes and/or techniques described herein. System 100 may sense temperature of brake assembly 106 of vehicle 102 (604). Processing circuitry 113 of system 100 may sense temperature of brake assembly 106 via one or more of sensor(s) 108, e.g., via temperature sensor(s) 110. Processing circuitry 113 may sense the temperature(s) of specific components of brake assembly 106 (e.g., one or more discs of brake assembly 106) via the one or more of sensor(s) 108. In some examples, processing circuitry 113 periodically senses the temperature of brake assembly 106 at regular time intervals (e.g., one per thirty seconds, once per minute, once per five minutes). In some examples, processing circuitry 113 continuously senses the temperature of brake assembly 106 over time. Processing circuitry 113 may store the sensed temperatures in memory 118 of system 100 or within an external storage device/system.

System 100 may determine whether the temperature of brake assembly 106 (e.g., of one or more components of brake assembly 106) is less than or equal to a target temperature (606). The target temperature may correspond to an operating temperature at which brake assembly 106 may be activated to slow down or stop vehicle 102 without damage to component(s) of brake assembly 106. The operating temperature may be up to about 380° C. (e.g., about 716° F.). In some examples, the target temperature corresponds to a temperature at which brake assembly 106 is capable of passively cooling down to the operating time within a set period of time. The set period of time may be defined by an amount of time remaining until vehicle 102 is expected to begin moving and/or increase speed. In such examples, the target temperature may be greater than a maximum operating temperature by a specified amount. The specific amount may be dependent on a temperature of the environment surrounding vehicle 102. Processing circuitry 113 may receive/retrieve the target temperature and/or the set period from a guidance/navigation system of vehicle 102, from an external guidance/navigation system (e.g., from a base station), and/or from operator of vehicle 102 via communications circuitry 116 and/or UI 120.

Based on a determination that the temperature of brake assembly 106 is greater than the target temperature value ("NO" branch of 606), system 100 may continue to cause brake cooling device 114 to cool brake assembly 106 (602) and sense temperature of brake assembly 106 (604). Based on a determination that the temperature of brake assembly 106 is less than or equal to the target temperature ("YES" branch of 606), system 100 may cause brake cooling device 114 to terminate cooling of brake assembly 106 (608). For example, processing circuitry 113 may transmit a signal to brake cooling device 114 to cause brake cooling device 114 to terminate cooling of brake assembly 106.

The present disclosure includes the following examples.

Example 1: a system for a vehicle comprising: a plurality of sensors, wherein at least one sensor of the plurality of sensors is coupled to a brake assembly of a vehicle; and a brake control unit comprising processing circuitry and coupled to the plurality of sensors and a brake cooling device of the vehicle, wherein the brake cooling device is configured to cool the brake assembly of the vehicle, and wherein the brake control unit is configured to: receive, from the plurality of sensors, signals corresponding to temperatures of the one or more brakes, a status of the vehicle, and a cooling rate of the brake cooling device; and cause the brake cooling device to begin cooling the one or more brakes in response to: a determination that the cooling rate of the brake cooling device satisfies a threshold cooling rate; and one or more of a determination that the temperatures of the one or more brakes satisfies a threshold temperature, or a determination that the status of the vehicle satisfies at least one threshold status of one or more threshold statuses.

Example 2: the system of example 1, wherein the brake control unit is configured to: determine the cooling rate of the brake cooling device as the brake cooling device is cooling the one or more brakes; compare the cooling rate against the threshold cooling rate; and based on a determination that the cooling rate is less than or equal to the threshold cooling rate, cause the brake cooling device to terminate cooling of the one or more brakes.

Example 3: the system of any of examples 1 or 2, wherein the plurality of sensors comprises a weight on wheels (WOW) sensor, and wherein to determine that the status of the vehicle satisfies the at least one threshold status of the one or more threshold statuses, the brake control unit is configured to: receive at least one signal from the WOW sensor of the vehicle; determine, based on the received at least one signal from the WOW sensor, whether the vehicle is airborne or grounded; and determine that the status of the vehicle satisfies the at least one threshold status based on a determination that the vehicle is grounded and that a velocity of the vehicle is less than or equal to a threshold velocity.

Example 4: the system of example 3, wherein the threshold velocity is 30 knots.

Example 5: the system of any of examples 1-4, wherein the plurality of sensors comprises a weight on wheels (WOW) sensor, and wherein to determine that the status of the vehicle satisfies the at least one threshold status of the one or more threshold statuses, the brake control unit is configured to: receive at least one signal from the WOW sensor of the vehicle; determine, based on the at least one signal from the WOW sensor, whether the vehicle is airborne or grounded; and determine that the status of the vehicle satisfies the at least one threshold status based in a determination that the vehicle is grounded for at least a threshold period of time.

Example 6: the system of any of examples 1-5, wherein to determine that the cooling rate of the brake cooling device satisfies the threshold cooling rate, the brake control unit is configured to determine that a prior cooling rate of the brake cooling device from a prior voyage is greater than or equal to the threshold cooling rate.

Example 7: the system of any of examples 1-6, wherein the brake cooling device comprises a fan and a motor coupled to the fan, and wherein to cause the brake cooling device to begin cooling the one or more brakes, the brake control unit is configured to cause the motor to begin rotating the fan.

Example 8: the system of any of examples 1-7, wherein the at least one sensor comprises a brake temperature probe.

Example 9: the system of any of examples 1-8, wherein the vehicle comprises an aircraft, wherein the plurality of sensors comprises one or more sensors coupled to a landing gear control unit (LGCU) of the aircraft, and wherein the braking control unit is configured to receive signals corresponding to the status of the vehicle from the one or more sensors.

Example 10: the system of any of examples 1-9, wherein the threshold brake temperature is 100 degrees Celsius.

Example 11: a method comprising: receiving, by a brake control unit of a vehicle from one or more sensors of the vehicle, signals corresponding to temperatures of one or more brakes of the vehicle, a status of the vehicle, and a status of a brake cooling device of the vehicle; determining, by the brake control unit, that the status of the brake control unit satisfies a threshold brake control unit status; determining, by the brake control unit, that the received signals satisfy one or more threshold conditions, wherein the one or more threshold conditions comprises one or more of: a threshold brake temperature; or one or more threshold vehicle statuses; and in response to determining that the received signals satisfy the one or more threshold conditions and that the status of the brake control unit satisfies the threshold brake control unit status, causing, by the brake control unit, the brake cooling device to actively cool the one or more brakes.

Example 12: the method of example 11, further comprising: determining, by the brake control unit and based on the received signals, a cooling rate of the brake control unit; comparing, by the brake control unit, the cooling rate against a threshold cooling rate; and in response to determining that the cooling rate is less than or equal to the threshold cooling rate, causing, by the brake control unit, the brake cooling device to terminate cooling of the one or more brakes.

Example 13: the method of any of examples 11 or 12, wherein the threshold brake control unit status comprises one or more of: a threshold cooling rate of the brake control unit; or a threshold period of time since a prior inspection of the brake cooling device.

Example 14: the method of any of examples 11-13, wherein the one or more sensors comprises a weight on wheels (WOW) sensor, wherein the status of the vehicle comprises an indication of vehicle position from the WOW sensor, and wherein determining that the received signals satisfy the one or more threshold conditions comprises: determining, by the brake control unit and based on the indication of vehicle position from the WOW sensor, that the vehicle is grounded; and determining, by the brake control unit and based on the indication of vehicle position from the WOW sensor, that a velocity of the vehicle; and determining, by the brake control unit, that the received signals satisfy the one or more threshold conditions based on a determination that the vehicle is grounded and that the velocity of the vehicle is less than or equal to a threshold velocity.

Example 15: the method of example 14, wherein the threshold velocity is 30 knots.

Example 16: the method of any of examples 11-15, wherein the one or more sensors comprises a weight on wheels (WOW) sensor, wherein the status of the vehicle comprises an indication of vehicle position from the WOW sensor, and wherein determining that the received signals satisfy the one or more threshold conditions comprises: determining, by the brake control unit and based on the indication of vehicle position from the WOW sensor, that the vehicle is grounded for at least a threshold period of time.

Example 17: the method of any of examples 11-16, wherein the brake cooling device comprises a fan and a motor coupled to the fan, and wherein causing the brake cooling device to begin cooling the one or more brakes comprises causing, by the brake control unit, the motor to begin rotating the fan.

Example 18: the method of any of examples 11-17, wherein at least one sensor of the one or more sensors comprises a brake temperature probe.

Example 19: the method of any of examples 11-18, wherein the threshold brake temperature is 100 degrees Celsius.

Example 20: a computer-readable medium comprising instructions that, when executed, causes processing circuitry of a brake control unit of a vehicle to: receive, from one or more sensors of the vehicle, signals corresponding to temperatures of one or more brakes of the vehicle, a status of the vehicle, and a status of a brake cooling device of the vehicle; determine that the status of the brake control unit satisfies a threshold brake control unit status; determine that the received signals satisfy one or more threshold conditions, wherein the one or more threshold conditions comprises one or more of: a threshold brake temperature; or one or more threshold vehicle statuses; and in response to determining that the received signals satisfy the one or more threshold conditions and that the status of the brake control unit satisfies the threshold brake control unit status, cause the brake cooling device to actively cool the one or more brakes.

Example 21: the computer-readable medium of example 20, comprising instructions that, when executed, causes the processing circuitry to perform the method of any of examples 12-19.

The techniques described in this disclosure, including those attributed to processing circuitry 113 and other control circuitry, processing circuitry, sensors, or various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in any suitable device. Processing circuitry, control circuitry, and sensing circuitry, as well as other processors, controllers, and sensors described herein, may be implemented at least in part as, or include, one or more executable applications, application modules, libraries, classes, methods, objects, routines, subroutines, firmware, and/or embedded code, for example. In addition, analog circuits, components, and circuit elements may be employed to construct one, some or all of the control circuitry and sensors, instead of or in addition to the partially or wholly digital hardware and/or software described herein. Accordingly, analog or digital hardware may be employed, or a combination of the two.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

Various examples have been described. These and other examples are within the scope of the following claims.

What is claimed is:

1. A system for a vehicle comprising:
   a plurality of sensors, wherein at least one sensor of the plurality of sensors is coupled to a brake assembly of a vehicle, and wherein the plurality of sensors comprises a weight on wheels (WOW) sensor; and
   a brake control unit comprising processing circuitry and coupled to the plurality of sensors and a brake cooling device of the vehicle, wherein the brake cooling device is configured to cool the brake assembly of the vehicle, and wherein the brake control unit is configured to:
      receive, from the plurality of sensors, signals corresponding to temperatures of one or more brakes of the vehicle, a status of the vehicle, and a cooling rate of the brake cooling device;
      determine that the status of the vehicle satisfies at least one threshold status by:
         receiving at least one signal from the WOW sensor;
         determining, based on the received at least one signal, that the vehicle is grounded; and
         determining that a velocity of the vehicle is less than or equal to a threshold velocity; and
      cause the brake cooling device to begin cooling the one or more brakes in response to:
         a determination that the cooling rate of the brake cooling device satisfies a threshold cooling rate; and
         one or more of a determination that the temperatures of the one or more brakes satisfies a threshold temperature, or a determination that the status of the vehicle satisfies the at least one threshold status of one or more threshold statuses.

2. The system of claim 1, wherein the brake control unit is configured to:
   determine the cooling rate of the brake cooling device as the brake cooling device is cooling the one or more brakes;
   compare the cooling rate against the threshold cooling rate; and
   based on a determination that the cooling rate is less than or equal to the threshold cooling rate, cause the brake cooling device to terminate cooling of the one or more brakes.

3. The system of claim 1, wherein the threshold velocity is 30 knots.

4. The system of claim 1, wherein to determine that the status of the vehicle satisfies the at least one threshold status of the one or more threshold statuses, the brake control unit is configured to:
   determine that the status of the vehicle satisfies the at least one threshold status based on a determination that the vehicle is grounded for at least a threshold period of time.

5. The system of claim 1, wherein to determine that the cooling rate of the brake cooling device satisfies the threshold cooling rate, the brake control unit is configured to determine that a prior cooling rate of the brake cooling device from a prior voyage is greater than or equal to the threshold cooling rate.

6. The system of claim 1, wherein the brake cooling device comprises a fan and a motor coupled to the fan, and wherein to cause the brake cooling device to begin cooling the one or more brakes, the brake control unit is configured to cause the motor to begin rotating the fan.

7. The system of claim 1, wherein the at least one sensor comprises a brake temperature probe.

8. The system of claim 1, wherein the vehicle comprises an aircraft, wherein the plurality of sensors comprises one or more sensors coupled to a landing gear control unit (LGCU) of the aircraft, and wherein the braking control unit is configured to receive signals corresponding to the status of the vehicle from the one or more sensors.

9. The system of claim 1, wherein the threshold brake temperature is 100 degrees Celsius.

10. A method comprising:
   receiving, by a brake control unit of a vehicle from one or more sensors of the vehicle comprising a weight on wheels (WOW) sensor, signals corresponding to temperatures of one or more brakes of the vehicle, a status of the vehicle comprising an indication of vehicle position from the WOW sensor, and a status of a brake cooling device of the vehicle;
   determining, by the brake control unit, that the status of the brake control unit satisfies a threshold brake control unit status;
   determining, by the brake control unit, that the received signals satisfy one or more threshold conditions by:
      determining, by the brake control unit and based on the indication of vehicle position from the WOW sensor, that the vehicle is grounded;
      determining, by the brake control unit and based on the indication of vehicle position from the WOW sensor, a velocity of the vehicle; and
      determining, by the brake control unit, that the velocity of the vehicle is less than or equal to a threshold velocity; and in response to determining that the received signals satisfy the one or more threshold conditions and that the status of the brake control unit satisfies the threshold brake control unit status, causing, by the brake control unit, the brake cooling device to actively cool the one or more brakes.

11. The method of claim 10, further comprising:

determining, by the brake control unit and based on the received signals, a cooling rate of the brake control unit;

comparing, by the brake control unit, the cooling rate against a threshold cooling rate; and in response to determining that the cooling rate is less than or equal to the threshold cooling rate, causing, by the brake control unit, the brake cooling device to terminate cooling of the one or more brakes.

12. The method of claim 10, wherein the threshold brake control unit status comprises one or more of:

a threshold cooling rate of the brake control unit; or a threshold period of time since a prior inspection of the brake cooling device.

13. The method of claim 10, wherein the threshold velocity is 30 knots.

14. The method of claim 10, wherein determining that the received signals satisfy the one or more threshold conditions comprises:

determining, by the brake control unit and based on the indication of vehicle position from the WOW sensor, that the vehicle is grounded for at least a threshold period of time.

15. The method of claim 10, wherein the brake cooling device comprises a fan and a motor coupled to the fan, and wherein causing the brake cooling device to begin cooling the one or more brakes comprises causing, by the brake control unit, the motor to begin rotating the fan.

16. The method of claim 10, wherein the one or more threshold conditions comprises a threshold brake temperature, wherein at least one sensor of the one or more sensors comprises a brake temperature probe, and wherein determining, by the brake control unit, that the received signals satisfy one or more threshold conditions comprises:

determining, by the brake control unit and based on the indication of vehicle position from the WOW sensor, that the vehicle is grounded; and determining, by the brake control unit and based a signal from the brake temperature probe; that a temperature of the one or more brakes satisfies the threshold brake temperature.

17. The method of claim 16, wherein the threshold brake temperature is 100 degrees Celsius.

18. A computer-readable medium comprising instructions that, when executed, causes processing circuitry of a brake control unit of a vehicle to cause the brake control unit to:

receive, from a weight on wheels (WOW) sensor of the vehicle, signals corresponding to temperatures of one or more brakes of the vehicle, a status of the vehicle, and a status of a brake cooling device of the vehicle;

determine that the status of the brake control unit satisfies a threshold brake control unit status;

determine that the received signals satisfy one or more threshold conditions by:

receiving at least one signal from the WOW sensor;

determining, based on the received at least one signal, that the vehicle is grounded; and determining, based on the received at least one signal, that a velocity of the vehicle is less than or equal to a threshold velocity; and in response to determining that the received signals satisfy the one or more threshold conditions and that the status of the brake control unit satisfies the threshold brake control unit status, cause the brake cooling device to actively cool the one or more brakes.

19. The computer readable medium of claim 18, wherein the threshold velocity is 30 knots.

20. The computer readable medium of claim 18, further comprising instructions that, when executed, causes the processing circuitry to cause the brake control unit to determine that the received signals satisfy the one or more threshold conditions by determining, based on the received at least one signal from the WOW sensor, that the vehicle is grounded for at least a threshold period of time.

* * * * *